United States Patent [19]

Pinkenhagen

[11] 4,381,410

[45] Apr. 26, 1983

[54] α,β-UNSATURATED ALDEHYDES AND THEIR USE AS FLAVOR-MODIFYING INGREDIENTS

[75] Inventor: Wilhelm Pinkenhagen, Chavannes-des-Bois, Switzerland

[73] Assignee: Firmenich SA, Geneva, Switzerland

[21] Appl. No.: 231,791

[22] Filed: Feb. 5, 1981

Related U.S. Application Data

[62] Division of Ser. No. 73,466, Sep. 7, 1979.

[30] Foreign Application Priority Data

Sep. 14, 1978 [CH]  Switzerland ..................... 9632/78

[51] Int. Cl.$^3$ ............................................. C07C 47/21
[52] U.S. Cl. ................... 568/448; 252/522 R; 426/534; 568/449
[58] Field of Search ............... 568/420, 448, 449, 421; 426/534; 252/522

[56] References Cited

U.S. PATENT DOCUMENTS

| | | | |
|---|---|---|---|
| 3,453,317 | 7/1969 | Marbet et al. ..................... | 568/448 |
| 3,654,309 | 4/1972 | Thomas ............................. | 426/534 |
| 3,655,397 | 4/1972 | Parliment et al. ................. | 426/534 |
| 3,704,714 | 12/1972 | Kallianos et al. .................. | 426/534 |
| 3,886,297 | 5/1975 | Parliment et al. ................. | 426/534 |
| 3,914,451 | 10/1975 | Schreiber et al. .................. | 426/534 |
| 4,010,207 | 3/1977 | Hall et al. ......................... | 568/448 |
| 4,021,411 | 5/1977 | Goetz et al. ....................... | 568/448 |
| 4,041,185 | 8/1977 | Parliment ........................... | 426/534 |
| 4,145,366 | 3/1979 | Ichikama .......................... | 568/448 |
| 4,283,433 | 8/1981 | Pickenhager ...................... | 568/448 |

FOREIGN PATENT DOCUMENTS 2031261  4/1980  United Kingdom ................ 426/534

OTHER PUBLICATIONS

Sathe et al., "Indian Jr. of Chemistry", vol. 4 (9) 1966, pp. 393-395.
Price et al., "J. Amer. Chem. Soc.", vol. 72 (1950), 2613-2615.
"Neue Methoden der Praparativen Chemie", vol. VI, ed Foerst, Verlag Chemie, pp. 56-57.

*Primary Examiner*—Werren B. Lone
*Attorney, Agent, or Firm*—Pennie & Edmonds

[57] ABSTRACT

This invention relates to α,β-unsaturated aldehydes selected from the group consisting of 2,6-dimethyl-oct-2-en-1-al, 2,5-dimethyl-oct-2-en-1-al, 2,5-dimethyl-hept-2-en-1-al and 2-ethyl-7-methyl-oct-2-en-1-al and their use as flavor-modifying ingredients in the aromatization of foodstuffs, animal feeds or beverages.

1 Claim, No Drawings

α,β-UNSATURATED ALDEHYDES AND THEIR USE AS FLAVOR-MODIFYING INGREDIENTS

This is a division of application Ser. No. 73,466 filed Sept. 7, 1979.

SUMMARY OF THE INVENTION

The present invention relates to certain α,β-unsaturated aldehydes possessing useful organoleptic properties. More specifically, it relates to:
2,6-dimethyl-oct-2-en-1-al,
2,5-dimethyl-oct-2-en-1-al,
2,5-dimethyl-hept-2-en-1-al and
2-ethyl-7-methyl-oct-2-en-1-al.

The above compounds may be advantageously used in the flavor industry, namely as flavor-modifying ingredients for the aromatization of foodstuffs, animal feeds or beverages.

The following compounds are new:
2,5-dimethyl-oct-2-en-1-al,
2,5-dimethyl-hept-2-en-1-al and
2-ethyl-7-methyl-oct-2-en-1-al.

BACKGROUND OF THE INVENTION

Numerous aldehydic compounds are known in the art. For instance, dec-2-en-1-al is employed in the reconstitution of flavors of fruity type, especially of citrus-fruits, or in the manufacture of peach type aromas. Certain lower alkyl α,β-unsaturated aldehydes, such as hex-2-en-1-al, namely in its trans isomeric form, are used in compositions of strawberry, banana, apple or apricot type. Other unsaturated aldehydes having the double bond in the β,γ- or γ,δ-position find an advantageous utilization in the reconstitution of creamy and fatty notes. Hept-4-en-1-al belongs to this class of derivatives.

U.S. Pat. No. 3,914,451 describes the use as flavoring ingredient of 2-butyl-but-2-en-1-al, a compound possessing a gustative taste of sweet, slightly roasted and fatty character reminiscent of hazelnuts.

THE INVENTION

I have now surprisingly discovered that the α,β-unsaturated aldehydes of the instant invention develop various gustative notes such as fatty, roasted, grilled, burnt, meaty or even woody notes. The taste thereof is also reminiscent, in certain instances, of that of nuts, with green nuances.

The four unsaturated aldehydes of the invention include 2,6-dimethyl-oct-2-en-1-al, which possesses a particularly powerful flavor note the character thereof being reminiscent of certain aspects of the taste of potatoes when freshly subjected to frying, more generally to fried foodstuffs. It should be further noted in this respect that although 2,6-dimethyl-oct-2-en-1-al was described in the scientific literature—see Indian J. Chem. 4 (9) 393-5 (1966)—the interest thereof in the field of flavors was never recognized before.

Due to their valuable flavor modifying properties, the α,β-unsaturated aldehydes of the invention can be used for the aromatization of foodstuffs and beverages of various nature. Typically, they can be used to impart, improve or modify the meaty and fatty notes of meat or meat-imitating products produced for human or animal consumption.

The above disclosed aldehydes can also be advantageously used for the aromatization of cereals and, in particular, roasted cereals, wherein they develop or enhance a well appreciated fatty and oily note. In view of the above, they can also be used for flavoring dietetic foodstuffs, e.g. low-calorie foodstuffs.

The α,β-unsaturated aldehydes of the instant invention can be further used for flavoring coffee or coffee imitating products wherein they contribute to develop an interesting woody flavor note. 2,5-Dimethyl-oct-2-en-1-al for example, may impart a taste and flavor reminiscent of those of trans-non-2-en-1-al—see e.g. U.S. Pat. No. 3,886,297.

Consequently, the instant invention relates to a method for imparting, improving or modifying the organoleptic properties of foodstuffs, animal feeds and beverages which comprises adding thereto a small but flavoring effective amount of at least one of the α,β-unsaturated aldehydes selected from the group consisting of:
2,6-dimethyl-oct-2-en-1-al,
2,5-dimethyl-oct-2-en-1-al,
2,5-dimethyl-hept-2-en-1-al and
2-ethyl-7-methyl-oct-2-en-1-al.

The invention further relates to a method to impart, improve or modify the oily-green gustative note of foodstuffs subjected to a frying process which comprises adding thereto as flavoring effective ingredient at least one of the α,β-unsaturated aldehydes set forth hereinabove.

The invention also provides a composition comprising a foodstuff, an animal feed or a beverage and at least one of the above mentioned unsaturated aldehydes.

Another object of the invention consists in a foodstuff, an animal feed or a beverage having a meaty taste which comprises having added thereto as flavor modifying ingredient at least one of the above mentioned unsaturated aldehydes.

As new composition of matter, the invention provides finally the following compounds:
2,5-dimethyl-oct-2-en-1-al,
2,5-dimethyl-hept-2-en-1-al and
2-ethyl-7-methyl-oct-2-en-1-al.

PREFERRED EMBODIMENTS OF THE INVENTION

The proportions at which the said compounds can achieve interesting gustative effects may vary within wide limits. Generally, these proportions are of from about 0.01 to 2 ppm (parts per million) by weight based on the total weight of the material into which they are incorporated. Preferred proportions are on the order of about 0.1 or 0.2 ppm. These values, however, should not be interpreted restrictively and it should be understood by those skilled in the art that concentrations lower or higher than those indicated above may be used whenever it is desired to achieve special effects. It is moreover well known in the art that concentrations of a given flavoring agent depend on the nature of the specific material it is desired to aromatize and on the nature of the coingredients in a given flavor composition.

The aldehydes of the instant invention can be used on their own or in admixture with one or several flavoring coingredients. They are moreover frequently used in admixture with common edible solvents, such as ethyl alcohol, dipropylene-glycol or triacetine e.g.

The α,β-unsaturated aldehydes set forth hereinabove can be obtained in accordance with current methods, for example by means of aldol condensation of the appropriate saturated aldehydes or by cleavage of certain Schiff bases following the so-called Wittig type aldolization as described in "Neue Methoden der präparativen organischen Chemie" Vol. VI, W. Foerst Editor, Verlag Chemie, pages 56–57. The thus prepared unsaturated aldehydes were characterized as follows:

2,5-Dimethyl-hept-2-en-1-al

MS: m/e: 140 (3.5); 125 (8); 111 (15); 84 (100); 83 (23); 71 (17); 70 (24); 57 (62); 55 (47); 41 (69); 29 (59);
IR: 2995, 2900, 1685, 1640, 1460 cm$^{-1}$;
NMR: 9.41 (s, 1H); 6.52 (1H, t, J=7.5 Hz); 2.32 (2H, t, J=7.5 Hz); 1.75 (broad s, 3H); 1.1–1.6 (3H, m); ca. 0.98 (6H) $\delta$ ppm.

2,5-Dimethyl-oct-2-en-1-al

MS: m/e: 125 (6.9); 111 (8); 96 (8); 84 (100); 83 (15); 71 (24.5); 56 (23); 55 (43); 43 (100);
IR: 2980, 2950, 2900, 1685, 1640, 1460 cm$^{-1}$;
NMR: 9.33 (s, 1H); 6.48 and 6.46 (2 combined t, J=9 Hz, 1H); 2.1–2.45 (m, 2H); 1.73 (broad s, 3H); 1.1–1.4 (m, 5H); 0.89–0.96 (6H) $\delta$ ppm.

2-Ethyl-7-methyl-oct-2-en-1-al

MS: m/e: 168 (9); 153 (7); 135 (7); 126 (11.5); 125 (17); 111 (36); 98 (38); 85 (48); 83 (63); 84 (64); 69 (69); 57 (48); 55 (81); 43 (100); 41 (93);
IR: 2980, 2900, 1685, 1640, 1460 cm$^{-1}$;
NMR: 9.30 (s, 1H); 6.35 (t, J=7 Hz, 1H); 2.2–2.45 (m, 4H); 1.2–1.6 (m, 6H); 0.9–1.1 (8H) $\delta$ ppm.

2,6-Dimethyl-oct-2-en-1-al

MS: m/e: 125 (3); 107 (3.5); 97 (40); 84 (100); 83 (38); 71 (33); 69 (46); 55 (80); 43 (77); 41 (69);
IR: 2995, 2900, 1685, 1640, 1460 cm$^{-1}$;
NMR: 9.35 (s, 1H); 6.48; 6.46 (2 combined t, J=8 Hz, 1H); 2.40; 2.30 (2 combined t, J=8 Hz, 2H); 1.73 (broad s, 3H); 1.1–1.6 (m, 5H); 0.95 (broad s, 6H) $\delta$ ppm.

The saturated aldehydes used as starting material for the preparation of the aforementioned compounds, viz. 3-methyl-hexanol, 4-methyl-hexanal and 5-methyl-hexanal were obtained from the corresponding alcohols, after oxidation thereof according to the method disclosed in Tetrahedron Letters 1975, 2647. The literature relevant for the preparation of the said alcohols is indicated hereinafter.

| | |
|---|---|
| 3-methyl-hexanol | Beilstein 1 (II), 445 |
| 4-methyl-hexanol | DE-OS 25 58 657 |
| 5-methyl-hexanol | Chem. Abstr. 35, 2479$^2$ |

The invention is further illustrated by the following examples.

EXAMPLE 1

The compounds listed hereinafter were used for the aromatization of salted water (0.5% sodium chloride in water). The following table summarizes the opinion expressed by the panel of experienced flavorists who conducted the organoleptic evaluation.

| Compound tested | Dosage (ppm) | Evaluation comments |
|---|---|---|
| 2,6-dimethyl-oct-2-en-1-al | 0.15 | strong fried oil character, fried potato, beef fat, nutty, roasted, peanut |
| 2,5-dimethyl-oct-2-en-1-al | 0.10 | strong, woody, fatty, green, roasted fat, coffee |
| 2,5-dimethyl-hept-2-en-1-al | 0.20 | green, fatty, nutty, meat-like |
| 2-ethyl-7-methyl-oct-2-en-1-al | 0.10 | strong fatty-waxy character, burnt fat, green, oily. |

EXAMPLE 2

A commercial meat broth was flavored by making use of the compounds cited hereinafter at the given concentrations and then subjected to an organoleptic evaluation by comparison with an unflavored sample. The following table summarizes the opinion expressed by the panel of experienced flavorists who conducted the organoleptic evaluation.

| Compound tested | Dosage (ppm) | Evaluation comments |
|---|---|---|
| 2,6-dimethyl-oct-2-en-1-al | 0.10 | more fatty and meaty; more roasted character |
| 2,5-dimethyl-oct-2-en-1-al | 0.10 | more fatty; enhanced beef gravy character; richer |
| 2-ethyl-7-methyl-oct-2-en-1-al | 0.05 | fatty, meaty; more grilled character |

EXAMPLE 3

A sample of commercial peanut butter was flavored with 2,6-dimethyl-oct-2-en-1-al at a concentration of 0.2 ppm and then subjected to evaluation by comparison with an unflavored sample. It was observed that the flavored sample showed an enhanced peanut character, particularly in the green, earthy and roasted notes typical of peanut.

EXAMPLE 4

A soluble coffee of commercial origin was flavored by making use of 2,5-dimethyl-oct-2-en-1-al at a concentration of 0.01 ppm (based on the ready to drink beverage) and then compared with a similarly prepared coffee without added flavoring agent. It was noted that the flavored beverage showed enhanced overall coffee flavor and aroma, in particular in the green, woody and burnt notes typical of freshly ground coffee.

EXAMPLE 5

A sample of pasteurized milk of commercial origin was flavored with 2,5-dimethyl-oct-2-en-1-al at a concentration of 0.02 ppm and then compared with an unflavored sample of the same milk. It was first observed that the flavored milk had a more intense and creamy odor than that of the unflavored sample. It was further noted that the flavored milk possessed a fuller, more creamy-oily and slightly nut-like flavor.

EXAMPLE 6

A sample of industrial (unflavored) margarine was flavored by making the use of 2,5-dimethyl-oct-2-en-1-al at a concentration of 0.05 ppm and then subjected to an organoleptic evaluation by comparison with an unflavored sample of the same margarine. The flavored sample was found to be more rounded in flavor and taste, fresher, more creamy and more fatty-oily than the unflavored sample.

EXAMPLE 7

Several portions of a commercial hydrogenated vegetable oil having a bland taste were flavored by the use of the compounds cited hereinafter, at the following concentrations:

| | |
|---|---|
| A: 2,6-dimethyl-oct-2-en-1-al | 1.0 ppm |
| B: 2,5-dimethyl-oct-2-en-1-al | 1.0 ppm |
| C: 2-ethyl-7-methyl-oct-2-en-1-al | 0.5 ppm |

Samples of extruded corn snacks, based on 75% corn and 25% dehydrated potato powder, were then coated with the said oil portions in the following proportions (parts by weight):

| | Sample | | | |
|---|---|---|---|---|
| Ingredients | A | B | C | D[1] |
| Extruded snack | 80 | 80 | 80 | 80 |
| Oil flavored with A | 20 | — | — | — |
| Oil flavored with B | — | 20 | — | — |
| Oil flavored with C | — | — | 20 | — |
| Unflavored oil | — | — | — | 20 |
| Total | 100 | 100 | 100 | 100 |

[1]control material

The four samples were then subjected to an organoleptic evaluation, the opinion expressed by the panel of experienced flavorists being summarized in the following table:

| Sample | Dosage[1] | Evaluation comments |
|---|---|---|
| A | 0.2 ppm | enhanced flavor; more oily and roasted peanut than D |
| B | 0.2 ppm | more fried flavor note than D; more oily and nutty |
| C | 0.1 ppm | more oily "french fry" character than D; slightly meaty |

[1]dosage of the flavoring ingredient in the finished snack

I claim:
1. An $\alpha,\beta$-unsaturated aldehyde selected from the group consisting of:
2,5-dimethyl-oct-2-en-1-al,
2,5-dimethyl-hept-2-en-1-al and
2-ethyl-7-methyl-oct-2-en-1-al.

* * * * *